(12) United States Patent
Poor et al.

(10) Patent No.: US 7,020,457 B2
(45) Date of Patent: Mar. 28, 2006

(54) SYSTEM AND METHOD FOR PROXY-ENABLING A WIRELESS DEVICE TO AN EXISTING IP-BASED SERVICE

(75) Inventors: Graham V. Poor, Raleigh, NC (US); Margaret Mary Mahoney, Raleigh, NC (US)

(73) Assignee: Orative Corporation, San Jose, CA (US)

(*) Notice: Subject to any disclaimer, the term of this patent is extended or adjusted under 35 U.S.C. 154(b) by 0 days.

(21) Appl. No.: 09/872,485

(22) Filed: May 31, 2001

(65) Prior Publication Data

US 2002/0183080 A1 Dec. 5, 2002

(51) Int. Cl.
*H04Q 7/20* (2006.01)
*H04M 3/00* (2006.01)
*H04M 3/42* (2006.01)

(52) U.S. Cl. ............................... 455/412.1; 455/414.3; 455/414.4; 455/418; 455/419; 455/432.2; 455/432.3

(58) Field of Classification Search .............. 455/414.4, 455/432.2, 432.3, 418–420, 412.1, 412.2, 455/461, 550.1, 551, 552.1, 554.1, 554.2, 455/557, 414.3, 415, 88; 709/217, 227, 228, 709/230, 249, 236, 213, 247, 244; 715/513, 715/526; 370/332, 418
See application file for complete search history.

(56) References Cited

U.S. PATENT DOCUMENTS

| 5,457,680 A | * | 10/1995 | Kamm et al. ................ 370/332 |
| 5,742,668 A | * | 4/1998 | Pepe et al. .................... 455/415 |
| 5,742,905 A | * | 4/1998 | Pepe et al. .................... 455/461 |
| 6,061,718 A | * | 5/2000 | Nelson .......................... 455/88 |
| 6,397,259 B1 | * | 5/2002 | Lincke et al. ................ 709/236 |
| 6,457,879 B1 | * | 10/2002 | Thurlow et al. ............. 709/206 |
| 6,567,416 B1 | * | 5/2003 | Chuah .......................... 370/418 |
| 6,584,564 B1 | * | 6/2003 | Olkin et al. ................. 713/152 |
| 6,590,588 B1 | * | 7/2003 | Lincke et al. ............... 709/213 |
| 6,600,930 B1 | * | 7/2003 | Sakurai et al. ........... 455/414.3 |
| 6,610,105 B1 | * | 8/2003 | Martin et al. ................ 715/513 |

* cited by examiner

*Primary Examiner*—William Trost
*Assistant Examiner*—Meless Zewdu
(74) *Attorney, Agent, or Firm*—Shemwell Gregory & Courtney LLP

(57) ABSTRACT

An intermediate server or system having knowledge of application program protocols used by the application programs in a person's (i.e., user's) wireless device is used to translate information communicated with the device in accordance with a transport-level protocol and the same information communicated with a remote server or system that services the application program in use by that person.

16 Claims, 5 Drawing Sheets

FIG.2
GetMail message from wireless device to system

```
9195551212000015813276 99    — 18

GetMail
    config=yahoo_email         — 20
```

FIG.3
SendMessage message from wireless device to system

```
9195551212000015813276 99    — 18

SndMsg
    config=yahoo_email
    to=jsmith@msn.com           — 20
    from=bthomas@bonitasoftware.com
    subj=This is a test message
    body=Text of the message body
```

FIG.5
Message returned from mail server

```
Test Message 1~%~Bob Jones~%~05-22-2001~%~
    165813AU66705C5176312CED4@pop.mail.yahoo.com~%~
Test Message 2~%~Marion Smith~%~05-21-2001~%~
    446145UQ616101518894UOQ3@pop.mail.yahoo.com~%~    — 32
Test Message 3~%~Bill Mars~%~05-20-2001~%~
    760902YT60114209511180AB01@pop.excite.com~%~
```

FIG.7

```
User:9195551212
    password=9NFQxFJNkJ68CVQs
    config_name=yahoo_email
        type=email
        server=pop.mail.yahoo.com
        server_type=pop3
        userid=bthomas
        password=jUY65XcQW65u
        display_entries=10
    config_name=LDAP_search
        type=ldap
        server=ldap://nldap.com
```
~26

ChgConfig
    config=jsmithconfig
    [field=...,...]
```
~34

SYSTEM AND METHOD FOR PROXY-ENABLING A WIRELESS DEVICE TO AN EXISTING IP-BASED SERVICE

BACKGROUND OF THE INVENTION

1. Field of the Invention

The present invention relates generally to hand-held digital wireless data communication and computing devices of the types generally referred to as hand-held computers, personal digital assistants, cellular telephones, pagers and the like and, more specifically, to the protocols used by such wireless devices for communicating and interacting with remote servers.

2. Description of the Related Art

A distinct category of electronic communication and computing devices increasingly referred to in the art simply as "wireless devices" is coalescing from the previously distinct fields of mobile computing and cellular telephony. The category includes devices commonly referred to as palmtop or hand-held computers, personal digital assistants, organizers, "smart" cellular telephones, pagers, and the like. Cellular and similar mobile telephones and telephone-like devices include computer application program-like functions, such as games, contact managers and e-mail. Personal digital assistants (PDAs) and other computer-like devices can include remote communication functions such as wireless networking for communicating e-mail and data. The convergence of wireless digital communication and mobile computing has given rise to wireless devices with substantial application program-like functionality.

There are presently few standards for wireless devices in the area of application layer protocols used by such wireless (client) devices for communicating with remotely located (server) computers, even though Internet Protocol (IP) may be the standard network layer protocol. For example, a server computer that implements an e-mail service may require that clients, such as the wireless devices described above, communicate with it using the Post Office Protocol (POP), but another server that implements an e-mail service may require that clients communicate with it using Internet Message Access Protocol (IMAP). An application program developer wishing to provide products to both users of POP-based email services and users of IMAP-based e-mail services must develop a separate version of the application for each protocol. Developing and maintaining multiple versions of the same application program to suit different users is inefficient and uneconomical for software developers.

Furthermore, different types of services almost invariably involve different protocols. For example, while a server that implements an e-mail service may require that clients communicate with it using POP, a server that implements a directory service (e.g., a database in which a user can search persons' names and addresses) may require that clients communicate with it using the Lightweight Directory Access Protocol (LDAP). As the number of types of application programs commercially available for wireless devices increases, so does the number of protocols a device must handle if it is to run more than one application program. Each time a user installs a new type of application program on his wireless device, the device is required to handle a new application layer protocol. The increase in the total amount of code installed in a device as a result of it handling additional application layer protocols is inefficient and wasteful of memory and other device resources. Because power consumption is a major concern in wireless devices, they typically have limited memory capacity and limited processing power.

One way of implementing some applications is through the use of Wireless Application Protocol (WAP). WAP is a communications protocol and a platform-neutral application environment. It can be built on any operating system, including PALM-OS, EPOC, WINDOWS CE, FLEXOS, OS/9, JAVA-OS, etc. Nevertheless, WAP requires the installation of a WAP Browser on the device, thus occupying a substantial amount of memory. Furthermore, the WAP Browser only works in conjunction with a remote server that executes the application.

It would be desirable to provide a more standardized mechanism for handling application layer protocols in wireless devices that simplifies the tasks of application program developers and is efficient in its use of memory and other device resources. The present invention addresses these problems and deficiencies and others in the manner described below.

SUMMARY OF THE INVENTION

The present invention relates to using an intermediate server or system having knowledge of application program protocols used by the application programs in a person's (i.e., user's) wireless device to translate information communicated with the device in accordance with a transport-level protocol and the same information communicated with a remote server or system that services the application program in use by that person.

By using the intermediate server to directly speak native protocols, such users of wireless devices can subscribe to various electronic services, such as Internet e-mail and World Wide Web access, without their wireless devices having to support the individual application-level protocols required for communication with the server-side portion of the application programs used to access the services. Rather, each user's wireless device supports only a straightforward transport-level protocol that allows the client-side portion of each application program in the device to communicate with the intermediate server. The intermediate server has pre-stored on it in database format or other suitable format information identifying each user's wireless device and the application programs (i.e., client-side portions thereof) it contains, as well as information describing the application-level protocol that the server-side portion of each such application program requires for communication. When the intermediate server receives a message from a wireless device relating to one of its application programs, it looks up in the database the user (or the user's wireless device) and the user's service provider for the application program. The database entry reveals the application-level protocol that is required. The intermediate server then uses that protocol to communicate to the service provider's server further information it receives from the device relating to that application program.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 2 illustrates a Get Mail message transmitted by a wireless device to the system;

FIG. 3 illustrates a Send Message message transmitted by a wireless device to the system;

FIG. 5 illustrates a message returned from the mail server indicating mail messages addressed to the user;

FIG. 7 illustrates a configuration list for a user; and

FIG. 8 illustrates a Change Configuration message transmitted by a wireless device to the system.

DETAILED DESCRIPTION

Figure 1:
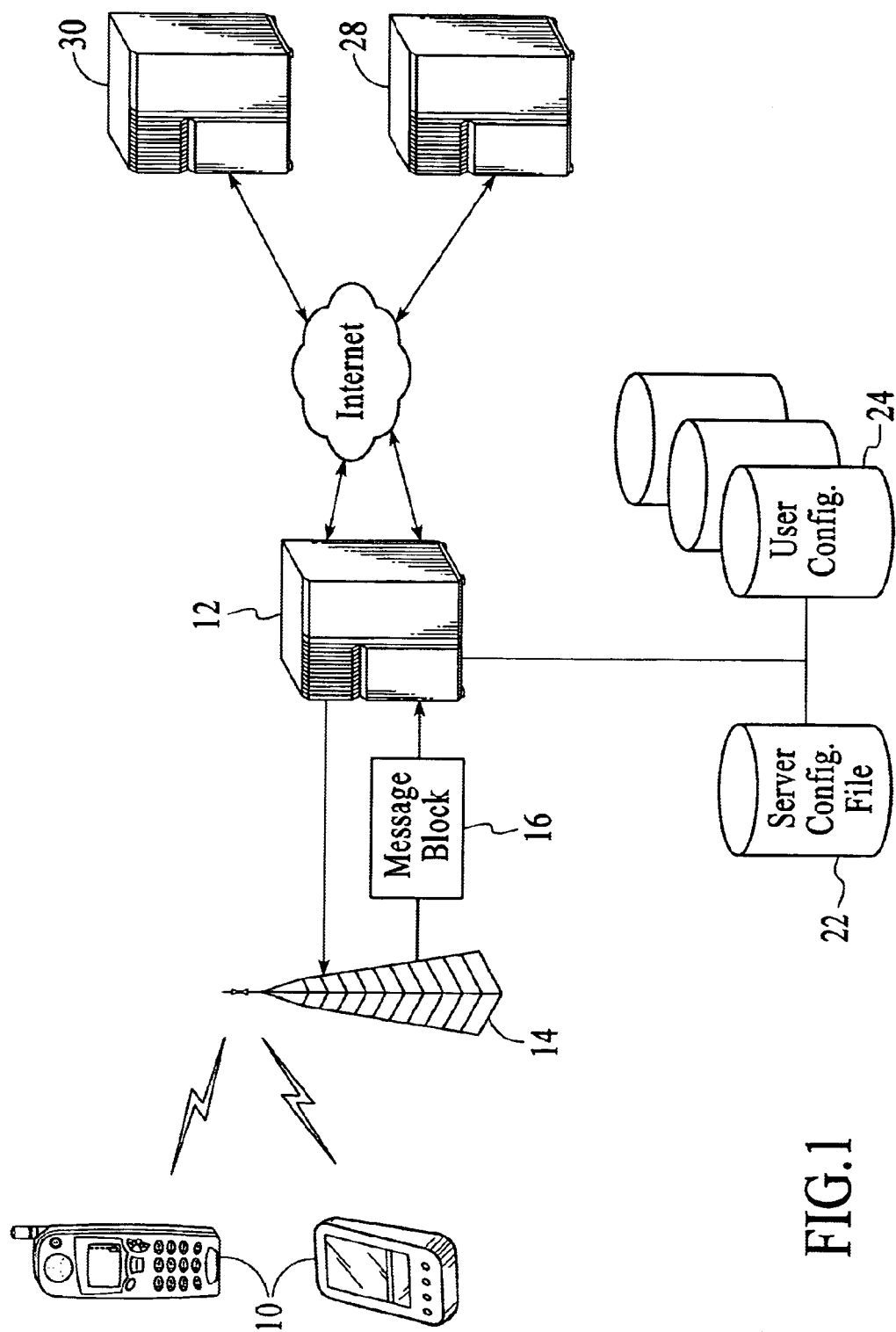
FIG. 1 illustrates a system or intermediate server for translating between a native protocol of a wireless device and protocols used by remote servers.

As illustrated in FIG. 1, various wireless devices 10 of the types generally referred to as mobile telephones, pagers, personal digital assistants, hand-held computers, and the like, all of which have some ability to execute application programs for a user, communicate with an intermediate system 12 via a wireless (i.e., radio-based) network 14. A software system in each wireless device 10 defines a layer or interface between the application programs and the native operating software of device 10. Examples of such native operating software include Palm, Inc.'s PALM-OS, Sun Microsystems' JAVA Virtual Machine (JVM), the Mobile Information Device Profile (MIDP), Personal JAVA (pJAVA), IBM's VISUAL AGE MICRO EDITION (VAME), JAVA 2 Platform Standard Edition (J2SE), and kAWT (kJAVA-environment flavor of Sun Microsystems' Abstract Window Toolkit (AWT)). Although only one network 14 is illustrated for purposes of clarity, there may be many, each communicating with many devices 10.

The software system in each device 10 formats information that is output by application programs into messages 16 having a format generally of the type illustrated in FIGS. 2 and 3 and passes the messages to the native operating software with the commands that cause the native operating software to encode, packetize, transmit and otherwise perform the conventional steps required to transmit the information via network 14. The information can be transmitted in Internet Protocol or other suitable well-known protocol. The manner in which device 10 transmits the formatted messages 16 and the manner in which network 14 receives them is conventional in wireless devices of the type to which the invention relates and is therefore not described in detail in this patent specification.

Each message that the software system generates has a header 18 and a body 20. (The representation of messages 16 in FIGS. 2 and 3 by means of a rectangle with rounded corners and a solid bar separating header 18 and body 20 is symbolic and for purposes of convenience and illustration only, as messages 16 are encoded in electronic text format much like electronic mail (e-mail) messages or any other electronic data and thus do not have an actual visual appearance.) Header 18 identifies the user and includes a user login identification number and a session identification number appended together. Both are obtained by the software system when the user logs into device 10 or similarly readies it for use (i.e., not all devices 10 need have formal login procedures whereby a user enters a user name and password, but some may). Body 20 includes an action such as "GetMail" or "SndMsg" (Send Message), a configuration identification such as "config=yahoo_email," and may further include additional fields. Thus, for example, when a user invokes the function in an e-mail application program to look for new mail addressed to the user, it communicates with the software system layer to format the mail query into message 16 of FIG. 2. Similarly, when a user invokes the e-mail application program function to send an e-mail message, it communicates with the software system layer to format the information provided by the application program into message 16 of FIG. 3. That message 16 includes in its body not only the configuration identification field "config=yahoo_email" but also a "to" field ("to=jsmith@msn.com"), a "from" field ("bthomas@bonitasoftware.com"), a subject field ("This is a test message"), and a body field ("Text of the message body.") Note that the body field is the body of the e-mail message and should not be confused with body 20 of message 16.

Figure 4:
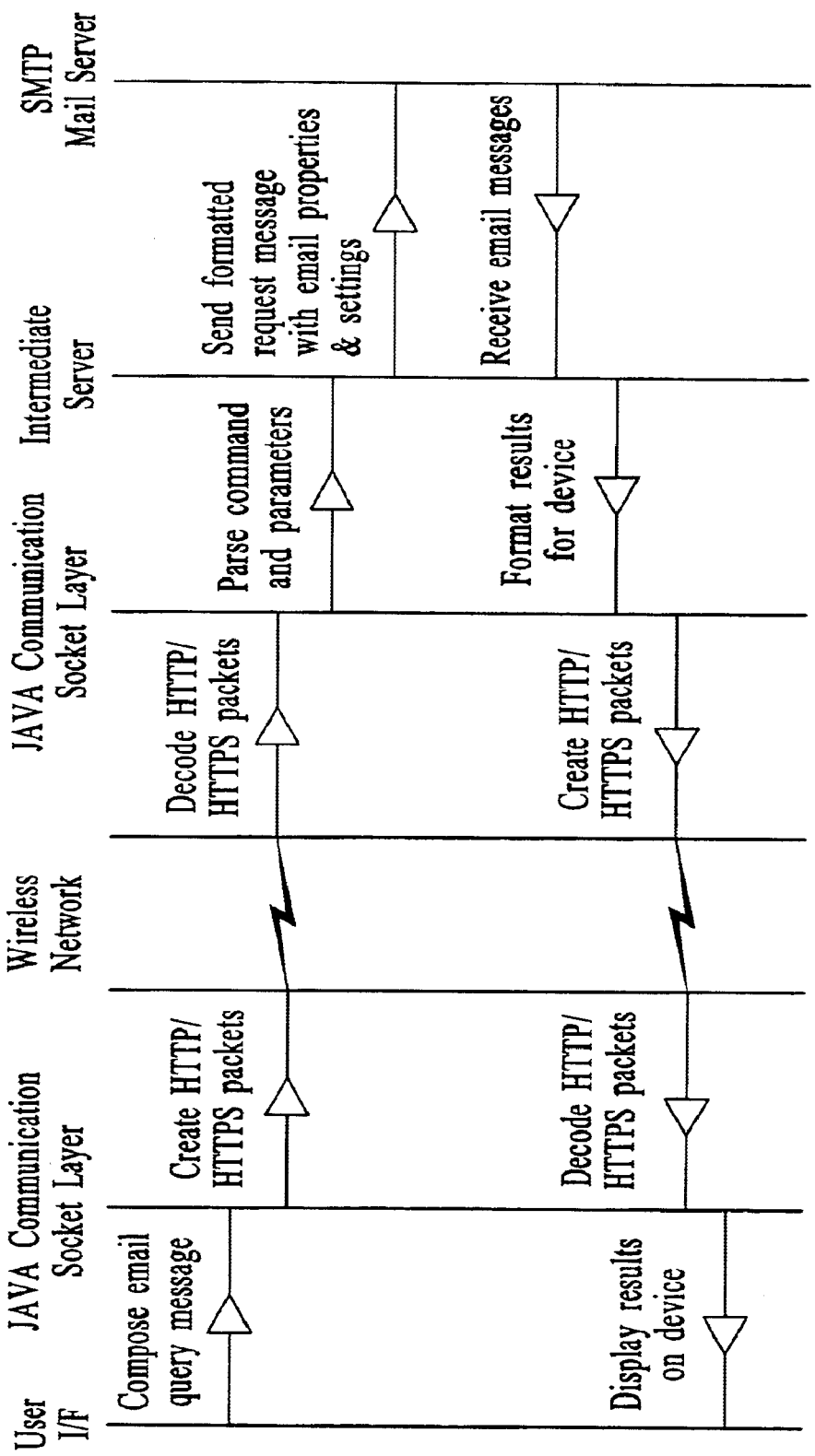
FIG. 4 is a sequence diagram illustrating the method for transmitting an e-mail query from a wireless device to a remote mail server via the intermediate system.

As illustrated in FIG. 4, the user interacts with the e-mail application program via the user interface of device 10 to compose the e-mail query. As noted above, the software system then formats the query into message 16 of the type shown in FIG. 2. The software system can encrypt message 16. The JAVA communication socket layer (or equivalent layer in embodiments of the invention in which the native operating environment is other than JAVA) encodes the text of message 16 into hypertext transfer protocol (HTTP) packets (or equivalent protocol elements in embodiments of the invention in which another protocol, such as UDP, is used by network 14). The HTTP defines packets as having a header and body, and both header 18 and body 20 are formatted into the body of the HTTP packet.

The wireless network interface in device 10 then transmits the packets via network 14. A base station of network 14 receives the packets, which are then forwarded to intermediate system 12 in the conventional manner.

Intermediate system 12 includes a server and associated hardware and software or other suitable processing system. Intermediate system 12 further includes a server configuration file or database 22 and a user configuration file or database 24.

Server configuration file 22 includes not only the conventional types of data used by server computers to perform general tasks but also a protocol database. The protocol database describes various application-level protocols and identifies the application programs with which they are associated. For example, it can describe the POP3 protocol associated with the YAHOO mail service with which computers and similar devices operated by subscribers to that service must communicate with YAHOO's mail server. Other application program services provided by YAHOO or other companies may use other protocols, such as IMAP. Such protocols are well-known in the art and are therefore not described in this patent specification.

As illustrated in FIG. 7, user configuration file 24 includes lists or configuration blocks 26 of users, identified by their login identification numbers (e.g., "User:9195551212"). Associated with each user is a list of application programs that the user's device 10 includes. For example, as illustrated by FIG. 7, device 10 operated by user 9195551212 can include an e-mail application and a directory application (Lightweight Directory Access Protocol or LDAP), as represented by the fields "config_name=yahoo_mail" and "config_name=LDAP_search," respectively. Listed under each of these application programs are the type of program (e.g., "email"), the identity of the server with which the program interacts (e.g., "pop.mail.yahoo.com"), the server type or protocol (e.g., "pop3"), the user's login identification for the server (e.g., "bthomas"), the user's password for logging in (e.g., "jUY65XcQW65u"), and the number of e-mail messages to display for the user at once ("10"). E-mail and LDAP are intended merely as examples or cases of application programs of the types with which users of wireless devices are familiar, and the nature and labeling of the above-referenced fields will depend upon the application in other cases. Persons skilled in the art will readily appreciate the fields needed in message 16 by any application program.

Referring again to FIG. 4, intermediate system 12 responds to receipt of message 16 of the type shown in FIG. 2 by decoding the packets back into text format and parsing them to retrieve the fields (i.e., commands and their parameters) described above with regard to FIG. 2: the user identification number and session number combination ("9195551212000001581327699"), the action ("GetMail"), and the configuration name ("yahoo_email"). Intermediate system 12 then further processes the information by looking up in user configuration database 24 the list that matches the user identification number. (If the session number is not valid, intermediate system 12 transmits a message back to device 10 requesting that the user log in again. The use of session numbers in this manner is conventional and therefore not described in further detail herein.) When system 12 finds the user's list of programs, it looks up the listed program that matches the configuration name received in message 16. Listed under that program is information that system 12 needs to communicate with the service to which the application program relates, namely, the identity of the server operated by the service, its protocol, how to log in to the server, and any other necessary information. In the example shown in FIG. 3, intermediate system 12 determines that the YAHOO e-mail service is operated on a server pop.mail.yahoo.com and that it uses the pop3 protocol. System 12 then refers to server configuration file 22 to determine the details of the pop3 protocol and the YAHOO e-mail server protocol. Referring to FIG. 1, system 12 then initiates communications via the Internet with the remote e-mail server 28 using the appropriate pop3 protocol, logging in to the user's account by submitting the user's login identification and password and performing any other steps required by that server to inquire whether the user has received any e-mail messages. Note that FIG. 4 applies in the same manner to communications directed to any other remote server 30. Other remote server 30 may be, for example, an LDAP server that interacts with the above-mentioned LDAP application program in a manner similar to that in which remote server 28 interacts with the e-mail program.

Remote e-mail server 28 can respond to the query by transmitting information to intermediate system 12 via the Internet that identifies e-mail messages addressed to the user logged into device 10. In the reverse manner from that described above, intermediate system 12 formats that information into messages having a format like the exemplary message 32 shown in FIG. 5. Although message 32, like messages 16, can have any suitable format that conveys the necessary information, in the illustrated embodiment of the invention message 32 includes fields separated by a delimiter such as "~%~". The first field is the e-mail subject, the next is the originator, the next is the date created, and the last is a unique message identifier. As is conventional in e-mail applications for wireless devices, for the convenience of the user, the information returned by the e-mail server 28 in response to a query does not include the body of each e-mail message. Rather, it includes only information identifying the messages. The user can then review this information and select one of the messages to view. The selection command would cause steps similar to those described above with regard to FIG. 4 to occur, resulting in server 28 retrieving the selected message and intermediate system 12 formatting the retrieved message into a suitable message similar to message 32.

Intermediate system 12 transmits message 32 or other message, such as one representing a retrieved e-mail message, to device 10 via network 14 in accordance with the HTTP or other protocol recognized by network 14 and wireless device 10. In the reverse manner from that described above, the native operating software of wireless device 10 decodes the received HTTP packets and parses the resulting text of message 32 or other message. The results, such as the list of e-mails from which the user can select one to retrieve and view, are then displayed for the user. (See FIG. 4.)

Figure 6:
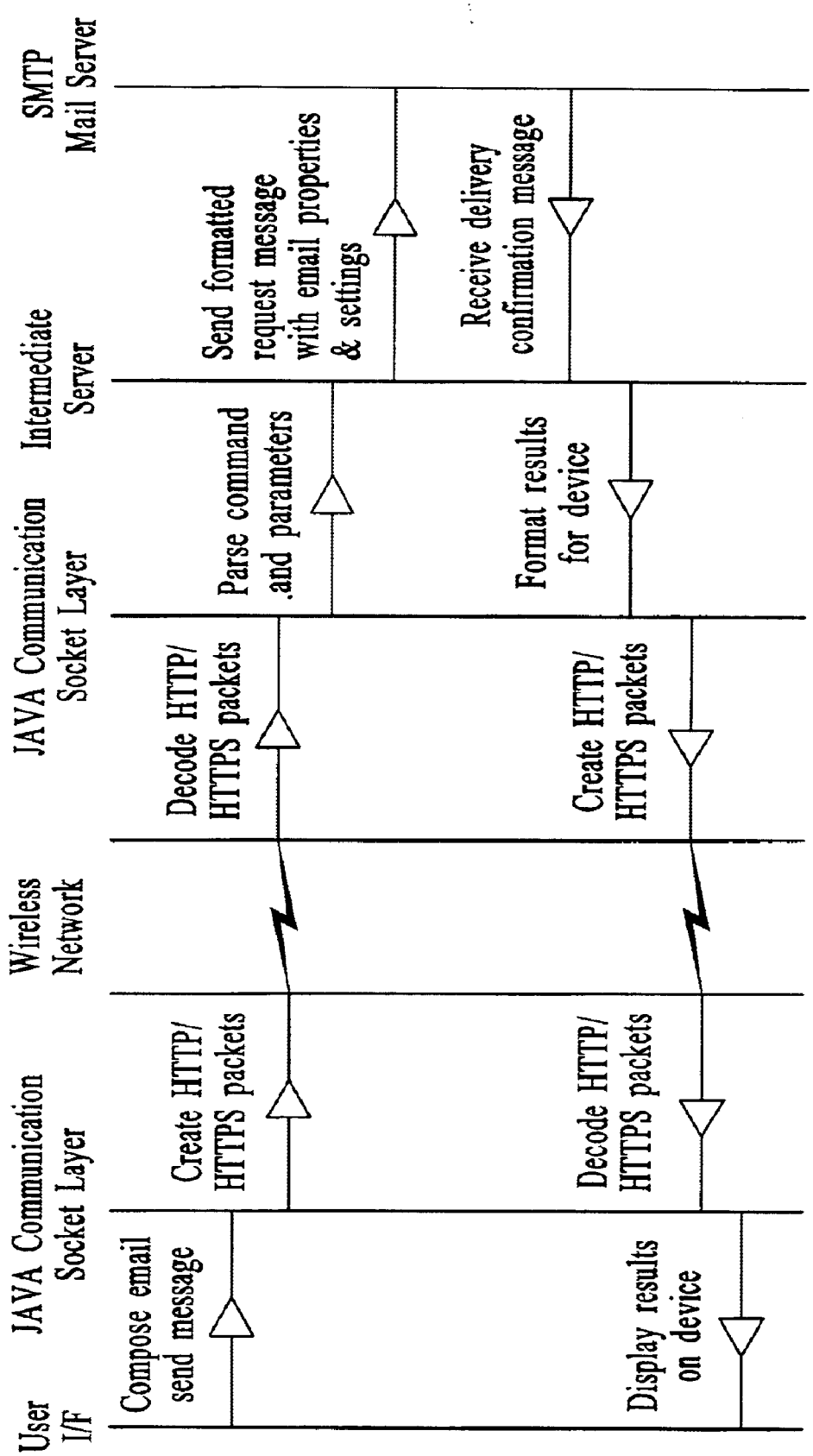
FIG. 6 is a sequence diagram illustrating a scenario including a user-initiated command as illustrated in FIG. 3.

As described above, FIG. 3 illustrates a message similar to that of FIG. 2 but relating to a user-initiated command to send mail that the user has composed. The sequence of steps that occur in this scenario is shown in FIG. 6 and is similar to that described above with respect to FIG. 4. Intermediate server 12 can create a suitable message (not shown) to send to device 10 to confirm that the e-mail message was sent.

A feature of the invention is that device 10 can be used to create, delete or change the user's list or configuration block in user configuration database 24. For example, a user can access a "Setup" function (not shown) in device 10 to change user settings. In response, as illustrated in FIG. 8, device 10 creates a message 34 that is similar to messages 16 and 32 described above but relates to the action of changing a configuration block ("ChgConfig"). A field in message 34 identifies the user's configuration block (e.g., "jsmithconfig"). The remaining fields are those that are to be changed. Intermediate system 12 responds to message 34 by looking up the identified configuration block in database 24 and changing the identified fields.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for communicating via an intermediate system between a plurality of wireless devices having client-side software associated with a plurality of application programs and a plurality of remote systems having server-side software associated with the application programs, comprising the steps of:

storing in the intermediate system descriptions of application-level protocols and indications of correspondences between the application-level protocols and the application programs, each application-level protocol having a corresponding association with one of the application programs;

storing in the intermediate system identifications of users and lists of application programs and remote systems associated with the users, each list listing the application programs associated with each user and listing a remote system associated with each application program in the list, wherein storing comprises storing user configuration lists, each user configuration list including information identifying a user and information identifying one or more application programs associated with the user;

in response to use of an application program by a user of one of the wireless devices, the intermediate system receiving information identifying the wireless device used and the application program used;

in response to receipt of the information identifying the wireless device used and the application program used, the intermediate system identifying the application-level protocol associated with the identified application program, and the intermediate system identifying the remote system associated with the identified wireless device and identified application program;

in response to the use of the application program, the intermediate system receiving application program output from the identified wireless device, the application program output received in accordance with a transport-level protocol, each wireless device of the plurality of wireless hand-held devices communicating respective application program output to the intermediate system in accordance with the transport-level protocol; and the intermediate system transmitting the received application program output in accordance with the identified application protocol to a remote system associated with the identified application program.

2. The method claimed in claim 1, wherein the step of the intermediate system receiving information comprises the intermediate system receiving a message having a header and a body, the header identifying the user by login identification, and the body identifying an action and an application program associated with the user and the action.

3. The method claimed in claim 2, wherein the body includes the application program output.

4. The method claimed in claim 3, wherein the application program output is an electronic mail message.

5. The method claimed in claim 2, wherein the action is selected from a group consisting of send mail and get mail.

6. The method claimed in claim 1, wherein the step of the intermediate system receiving information comprises the intermediate system receiving a message having a header and a body, the header identifying the user by login identification, and the body identifying an action and an application program associated with the user and the action.

7. The method claimed in claim 6, wherein each user configuration list includes information identifying a server associated with each application program and login information for the user associated with the application program.

8. The method claimed in claim 7, wherein the action is change configuration, and the body includes fields having values to replace values in corresponding fields of the configuration list associated with the identified user.

9. An intermediate system for facilitating communication between a plurality of wireless devices having client-side software associated with a plurality of application programs and a plurality of remote systems having server-side software associated with the application programs, comprising:

a protocol configuration database in which is storable descriptions of application-level protocols and indications of correspondences between the application-level protocols and the application programs, each application-level protocol having a corresponding association with one of the application programs;

a user configuration database in which is storable identifications of users and lists of application programs and remote systems associated with the users, each list listing the application programs associated with each user and listing a remote system associated with each application program in the list, wherein the lists include user configauration lists, each user configuration list including information identifying a user and information identifying one or more application programs associated with the user; and a processor system programmed to effect a method in accordance with the steps of:

in response to use of an application program by a user of one of the wireless devices, receiving information identifying the wireless device used and identifying the application program used;

in response to receipt of the information identifying the wireless device used and the application program used, identifying the application-level protocol associated with the identified application program, and the intermediate system identifying the remote system associated with the identified wireless device and identified application program;

in response to the use of the application program, receiving application program output from the identified wireless device, the application program output received in accordance with a transport-level protocol, each wireless device of the plurality of wireless hand-held devices communicating respective application program output to the intermediate system in accordance with the transport-level protocol; and transmitting the received application program output in accordance with the identified application protocol to a remote system associated with the identified application program.

10. The system claimed in claim 9, wherein the processor system receives a message having a header and a body, the header identifying the user by login identification, and the body identifying an action and an application program associated with the user and the action.

11. The system claimed in claim 10, wherein the body includes the application program output.

12. The method claimed in claim 11, wherein the application program output is an electronic mail message.

13. The method claimed in claim 10, wherein the action is selected from a group consisting of send mail and get mail.

14. The method claimed in claim 10, wherein the processor system receives a message having a header and a body, the header identifying the user by login identification, and the body identifying an action and an application program associated with the user and the action.

15. The method claimed in claim 14, wherein each user configuration list includes information identifying a server associated with each application program and login information for the user associated with the application program.

16. The method claimed in claim 15, wherein the action is change configuration, and the body includes fields having values to replace values in corresponding fields of the configuration list associated with the identified user.

* * * * *